United States Patent
Iwazaki

(10) Patent No.: US 8,041,480 B2
(45) Date of Patent: Oct. 18, 2011

(54) APPARATUS FOR ESTIMATING YAW RATE

(75) Inventor: Katsuhiko Iwazaki, Aichi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 900 days.

(21) Appl. No.: 12/020,938

(22) Filed: Jan. 28, 2008

(65) Prior Publication Data

US 2008/0189013 A1    Aug. 7, 2008

(30) Foreign Application Priority Data

Feb. 1, 2007  (JP) .................... 2007-023267

(51) Int. Cl.
*G05D 1/08* (2006.01)
*B60G 17/005* (2006.01)

(52) U.S. Cl. ...................... 701/41; 280/5.507

(58) Field of Classification Search .......... 701/38, 701/41, 69, 71, 72, 74, 82; 180/412; 280/5.507; 303/140, 146
See application file for complete search history.

(56) References Cited

U.S. PATENT DOCUMENTS

| | | | | |
|---|---|---|---|---|
| 4,836,319 A * | 6/1989 | Haseda et al. | ................ | 180/412 |
| 5,839,798 A * | 11/1998 | Monzaki et al. | .............. | 303/146 |
| 5,869,753 A * | 2/1999 | Asanuma et al. | .......... | 73/117.01 |
| 6,101,434 A * | 8/2000 | Irie et al. | .......................... | 701/36 |
| 6,363,309 B1 * | 3/2002 | Irie et al. | .......................... | 701/70 |
| 6,366,833 B1 * | 4/2002 | Fukuyama | ....................... | 701/1 |
| 6,556,911 B2 * | 4/2003 | Matsuno | ........................ | 701/80 |
| 7,356,391 B2 * | 4/2008 | Matsuda et al. | ................ | 701/22 |
| 7,647,150 B2 * | 1/2010 | Katayama | ....................... | 701/43 |
| 7,917,272 B2 * | 3/2011 | Suzuki et al. | .................... | 701/70 |
| 2008/0015778 A1 * | 1/2008 | Matsuura et al. | ............. | 701/301 |

FOREIGN PATENT DOCUMENTS

| | | | |
|---|---|---|---|
| JP | A-4-231265 | | 8/1992 |
| JP | A-06-171535 | | 6/1994 |
| JP | 08043422 A | * | 2/1996 |
| JP | A-11-192959 | | 7/1999 |
| JP | A-2003-118558 | | 4/2003 |
| JP | A-2004-217178 | | 8/2004 |
| JP | B2-3630280 | | 12/2004 |
| JP | A-2005-247019 | | 9/2005 |
| JP | A-2006-103510 | | 4/2006 |
| JP | A-2006-518302 | | 8/2006 |
| JP | 2007276564 A | * | 10/2007 |
| WO | WO 2004/074059 A2 | | 9/2004 |

\* cited by examiner

*Primary Examiner* — Anne Marie Boehler
*Assistant Examiner* — Daniel Yeagley
(74) *Attorney, Agent, or Firm* — Oliff & Berridge, PLC

(57) ABSTRACT

A future yaw rate γ(t) is estimated according to a current yaw rate γ(t) and a steering angular velocity. As compared with directly detecting the yaw rate γ(t) from a vehicle body, calculating the yaw rate γ(t) from a steering operation can attain a yaw rate having a phase advanced by a time lag Δt, whereby the future yaw rate γ(t) can be estimated accurately.

5 Claims, 3 Drawing Sheets

APPARATUS FOR ESTIMATING YAW RATE

BACKGROUND OF THE INVENTION

1. Field of the Invention

The present invention relates to an apparatus for estimating yaw rate, which estimates a yaw rate of a vehicle.

2. Related Background Art

Known as an apparatus equipped with means for estimating a yaw rate of a vehicle is one estimating the yaw rate according to the lateral acceleration and wheel speed of the vehicle (see, for example, Japanese Patent No. 3630280). The apparatus is equipped with a lateral acceleration sensor and a vehicle speed sensor, and estimates a yaw rate signal value according to a signal value detected by the lateral acceleration sensor and a vehicle speed signal value detected by the vehicle speed sensor.

SUMMARY OF THE INVENTION

For controlling the vehicle and assisting the driving thereof, it has recently been demanded to perform running control and the like while estimating the state of the vehicle. However, the above-mentioned apparatus fails to estimate a yaw rate after the lapse of a predetermined time, though it can estimate the yaw rate at present.

Meanwhile, as a method for estimating a physical amount after the lapse of a predetermined time from the present, one adding the change in physical amount per unit time multiplied by the predetermined time, i.e., the first-order derivative of the physical amount multiplied by the predetermined time, to the current physical amount has been known in general. Estimating the physical amount by this method has been problematic in that a large difference may occur between the estimated value and actual value depending on magnitudes of the predetermined time and change in the first-order derivative.

For overcoming such a problem, it is an object of the present invention to provide an apparatus for estimating yaw rate, which can estimate the yaw rate with a high accuracy.

Namely, the apparatus for estimating yaw rate in accordance with the present invention comprises a yaw rate acquiring part for acquiring a current yaw rate of a vehicle, a steering angle acquiring part for acquiring a steering angle of the vehicle, a steering angular velocity calculation unit for calculating a steering angular velocity according to the steering angle, and an estimation unit for estimating a yaw rate after a lapse of a predetermined time according to the current yaw rate and steering angular velocity.

The present invention estimates a future yaw rate according to the current yaw rate and steering angular velocity. When operating a vehicle, a time lag occurs between a steering operation and a vehicle body response. In this regard, behaviors of the steering wheel can be said to be in synchronization with those of the yaw rate while being advanced therefrom in terms of phase. Therefore, as compared with directly detecting the yaw rate from the vehicle body, calculating the yaw rate from the steering operation can attain a yaw rate having a phase advanced by the time lag. Thus, the yaw rate can accurately be estimated if a steering angle having a phase advanced from that of the yaw rate is used as an input.

For enhancing the foregoing effects, it will be preferred in the apparatus for estimating yaw rate if the estimation unit estimates the yaw rate after the lapse of the predetermined time to be a value obtained by adding the steering angular velocity multiplied by the predetermined time to the current yaw rate. Preferably, the yaw rate acquiring part is a yaw rate sensor. Preferably, the steering angle acquiring part is a steering angle sensor. Preferably, the steering angular velocity calculation unit and the estimation unit are constituted by an electronic control unit.

The present invention can estimate the yaw rate with a high accuracy.

DESCRIPTION OF THE PREFERRED EMBODIMENTS

In the following, an embodiment of the present invention will be explained with reference to the accompanying drawings. In the explanation of the drawings, the same elements will be referred to with the same numerals or letters while omitting their overlapping descriptions.

Figure 1:
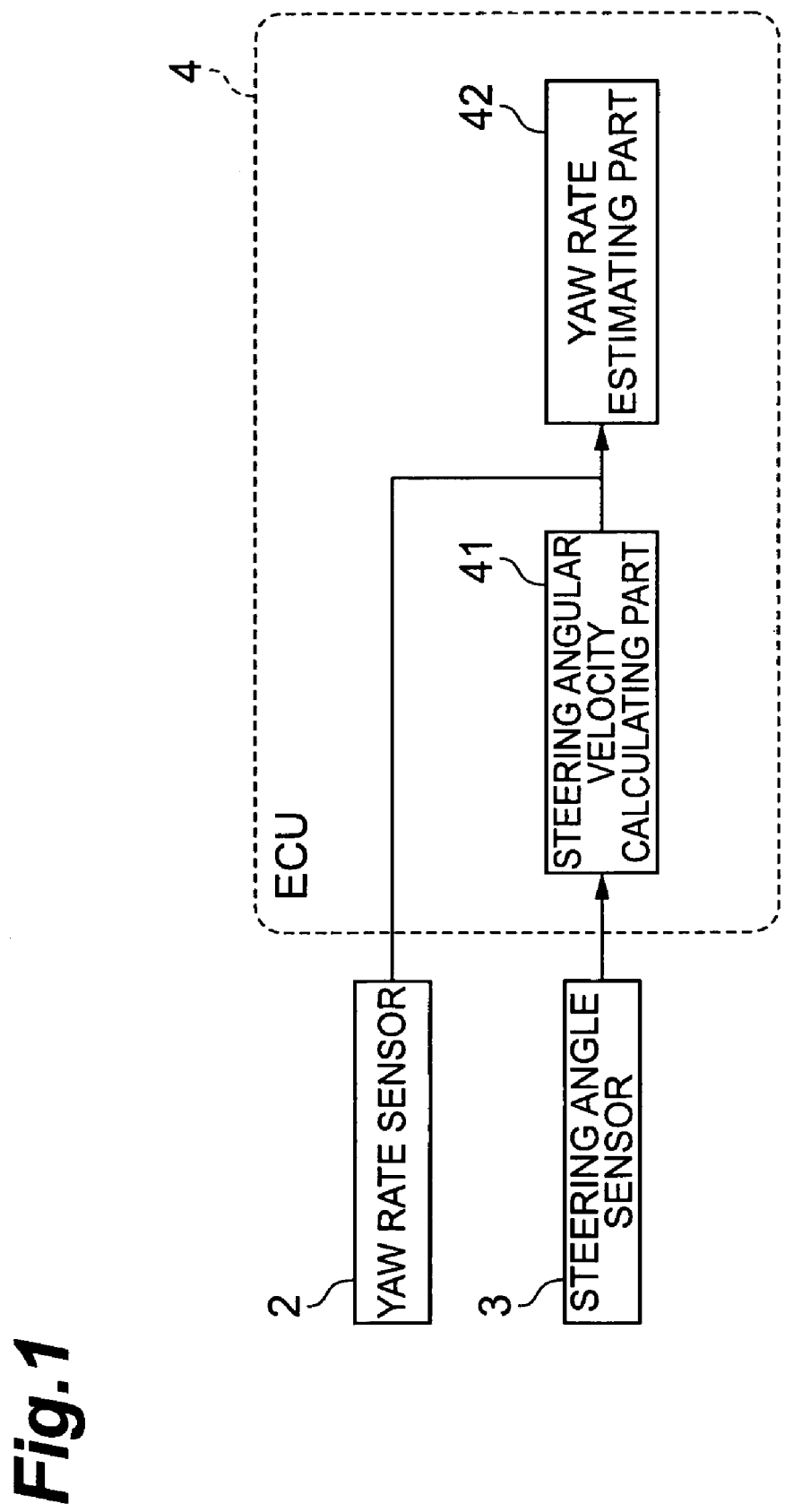
FIG. 1 is a diagram of the apparatus for estimating yaw rate in accordance with an embodiment.

FIG. 1 is a diagram of the apparatus for estimating yaw rate in accordance with the embodiment of the present invention. The apparatus for estimating yaw rate 1 in accordance with the embodiment is an apparatus for estimating a yaw rate after the lapse of a predetermined time from the present according to a steering angular velocity, and is used in a system for stably controlling behaviors of a vehicle, for example.

The apparatus for estimating yaw rate 1 comprises a yaw rate sensor (yaw rate acquiring means) 2, a steering angle sensor (steering angle acquiring means) 3, and an ECU 4. The ECU (Electronic Control Unit) is a computer of an automobile device for electronic control and comprises a CPU. (Central Processing Unit), a ROM (Read Only Memory), a RAM (Random Access Memory), I/O interfaces, etc.

The yaw rate sensor 2 is a sensor for detecting the horizontal rotational speed of the vehicle, i.e., yaw rate, for which one detecting the yaw rate by measuring a distortion generated by a rotary force of the vehicle with a piezoelectric device is employed, for example. The yaw rate sensor 2 functions to detect a yaw rate signal and output it to the ECU 4.

The steering angle sensor 3 is a sensor which detects the angle of a steering wheel turned by steering as a steering angle. The steering angle sensor 3 functions to detect the steering angle and output it to the ECU 4.

The ECU 4 comprises a steering angular velocity calculating part (steering angular velocity calculating means) 41 and a yaw rate estimating part (estimating means) 42. The steering angular velocity calculating part 41 functions to input the steering angle from the steering angle sensor 3 and differentiate it with respect to time, thereby calculating the steering angular velocity.

The steering angular velocity calculating part 41 also functions to output the calculated steering angle to the yaw rate estimating part 42. The yaw rate estimating part 42 functions to estimate a yaw rate according to the steering angular velocity obtained from the steering angular velocity calculating part 41 and the current yaw rate obtained from the yaw rate sensor 2.

Figure 2:
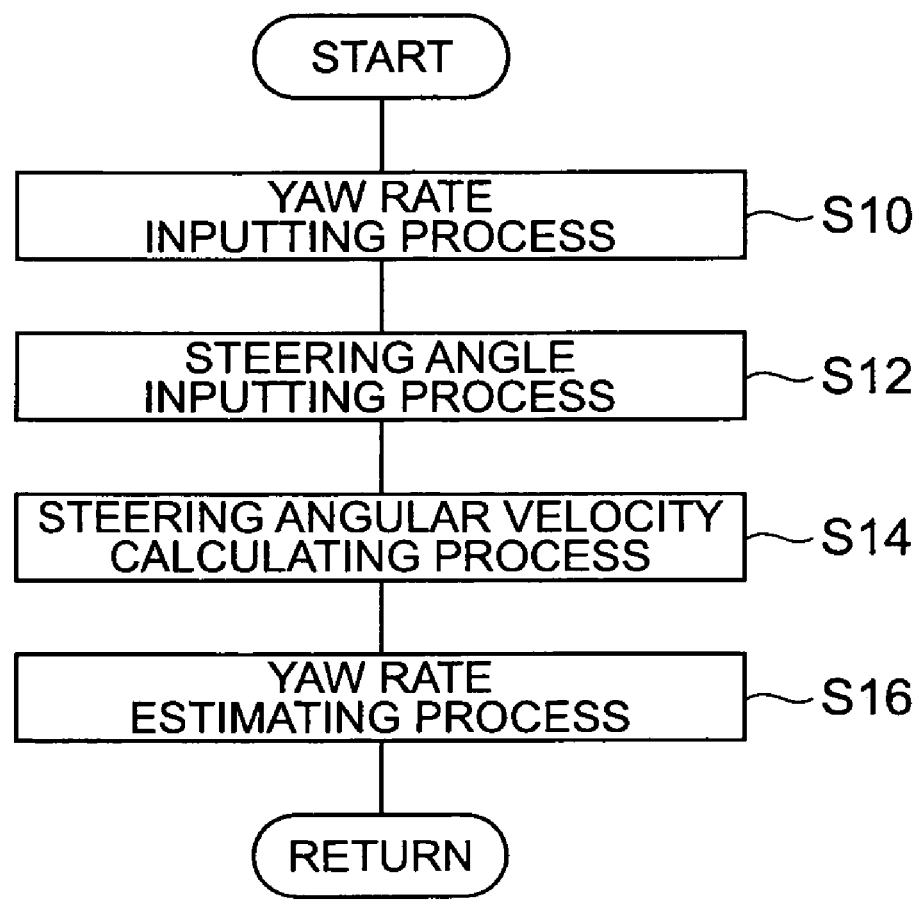
FIG. 2 is a flowchart showing operations of the apparatus for estimating yaw rate shown in FIG. 1.

Operations of the apparatus for estimating yaw rate in accordance with this embodiment will now be explained. FIG. 2 is a flowchart showing the operations of the apparatus for estimating yaw rate in accordance with the embodiment.

The control processing of FIG. 2 is executed by the ECU 4, for example, repeatedly at a predetermined timing after the ignition is turned on.

When the processing of FIG. 2 is started, a process for inputting the current yaw rate from the yaw rate sensor 2 to the ECU 4 begins (S10). After the process of S10 is completed, the flow shifts to a steering angle inputting process (S12). The process of S12 is one for inputting the steering angle from the steering angle sensor 3 to the ECU 4. After the process of S12 is completed, the flow shifts to a steering angular velocity calculating process (S14).

The process of S14 is one using the steering angle obtained by the process of S12 as an input and differentiating it with respect to time, thereby calculating the steering angular velocity. After the process of S14 is completed, the flow shifts to a yaw rate estimating process (S16).

The process of S16 is one for estimating a yaw rate after the lapse of $\tau$ seconds by using the current yaw rate obtained at S10 and the steering angular velocity obtained at S14. An estimating method will now be explained. Assuming that the steering angle $\phi(t)$ at time t is expressed by a sine wave when the steering angle $\phi$ is dependent on time and letting $\phi_0$ be the amplitude and $\omega$ the angular frequency, the steering angle $\phi(t)$ can be represented by equation (1).

$$\phi(t) = \phi_0 \cdot \sin(\omega \cdot t) \quad (1)$$

Here, the yaw rate $\gamma(t)$ at time t incurs a time lag caused by the time elapsing after inputting the steering angle $\phi(t)$ until a response occurs, i.e., by a phase retardation. Letting $\Delta t$ be the phase retardation and K the gain of the steering angle $\phi$ over the yaw rate $\gamma$, the yaw rate $\gamma$ can be represented by equation (2).

$$\gamma(t) = K \cdot \phi_0 \cdot \sin(\omega \cdot t - \Delta t) \quad (2)$$

From equations (1) and (2), the yaw rate $\gamma(t+\tau)$ after the lapse of $\tau$ seconds is estimated. The change with time of the steering angle $\phi(t)$ advanced by the phase $\Delta t$ from the yaw rate $\gamma(t)$ at time t multiplied by $\tau$ is added to the current yaw rate $\gamma(t)$, so as to calculate the yaw rate $\gamma(t+\tau)$ after the lapse of $\tau$ seconds. The estimated yaw rate can be represented by equation (3).

$$\gamma(t_0 + \tau) = \gamma(t_0) + \frac{\partial}{\partial t}\varphi(t)\Big|_{t=t_0} \cdot \tau \quad (3)$$

The process at S16 estimates the yaw rate by using equation (3). After the estimation is completed, the control processing of FIG. 2 ends.

Figure 3:
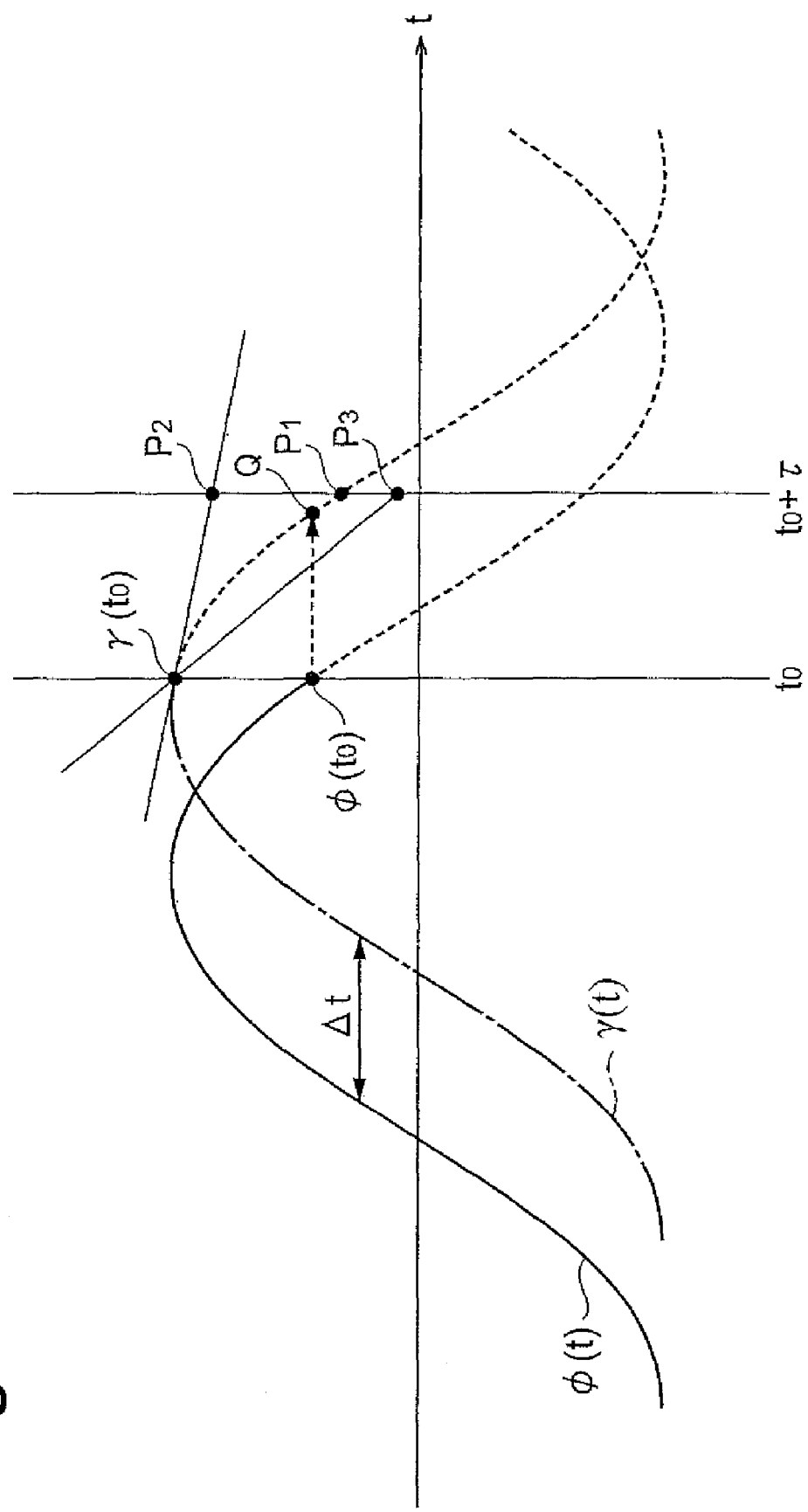
FIG. 3 is a graph showing effects of the apparatus for estimating yaw rate shown in FIG. 1.

Effects of the apparatus for estimating yaw rate in accordance with the embodiment will now be explained. Here, the case where the steering angle $\phi(t)$ and yaw rate $\gamma(t)$ are represented by equations (1) and (2), respectively, will be explained. For simplification, the gain K of the steering angle $\phi$ over the yaw rate $\gamma$ is assumed to be 1. FIG. 3 is a graph showing the time dependence of the steering angle and yaw rate, and estimated values of the yaw rate.

As shown in FIG. 3, the steering angle $\phi(t)$ indicated by a solid line is a sine wave, whose phase is advanced by $\Delta t$ from that of the yaw rate $\gamma$ indicated by a dash-single-dot line. Parts of the steering angle $\phi(t)$ and yaw rate $\gamma(t)$ indicated by broken lines in FIG. 3 show actual values of the steering angle $\phi(t)$ and yaw rate $\gamma(t)$ at the present time $t_0$ and thereafter.

The case where the yaw rate after the present time $t_0$ is estimated at the present time $t_0$ will now be considered. An example of this case estimates the yaw rate $\gamma(t_0+\tau)$ after the lapse of $\tau$ seconds. First, the yaw rate after the lapse of $\tau$ seconds is estimated by a conventional method. The conventional estimating method is one adding the amount of change in the current physical amount per unit time multiplied by a predetermined time to the current physical amount. Using equation (2), the estimated yaw rate can be represented by equation (4).

$$\gamma(t_0 + \tau) = \gamma(t_0) + \frac{\partial}{\partial t}\gamma(t)\Big|_{t=t_0} \cdot \tau = \gamma(t_0) + \varphi_0 \cdot \omega \cdot \tau \cdot \cos(\omega \cdot t_0 - \Delta t) \quad (4)$$

As a result, the yaw rate estimated by the conventional method at time $(t_0+\tau)$ becomes a value indicated by $P_2$ in FIG. 3. By contrast, the apparatus for estimating yaw rate 1 in accordance with the embodiment employs the amount of change in the current steering angle $\phi(t_0)$ per unit time instead of the amount of change in the current yaw rate $\gamma(t_0)$ per unit time used in the conventional estimating method. Since the steering angle $\phi(t_0)$ has a phase advanced by $\Delta t$ from that of the yaw rate $\gamma(t_0)$, the amount of change in the yaw rate at the time indicated by Q in FIG. 3 per unit time can be employed. The estimated yaw rate determined by this method can be represented by equation (5) using equations (1) and (3).

$$\gamma(t_0+\tau) = \gamma(t_0) + \phi_0 \cdot \omega \cdot \tau \cdot \cos(\omega \cdot t_0) \quad (5)$$

As a result, the yaw rate estimated at time $(t_0+\tau)$ by the apparatus for estimating yaw rate 1 in accordance with the embodiment becomes a value indicated by $P_3$ in FIG. 3, which is closer to the actual value $P_1$ than is the value indicated by $P_2$. From equations (4) and (5), the apparatus for estimating yaw rate 1 in accordance with the embodiment can obtain an estimated yaw rate value whose phase is advanced by $\Delta t$.

As in the foregoing, the apparatus for estimating yaw rate 1 in accordance with the embodiment can accurately estimate the yaw rate $\gamma(t)$ by using the angular velocity of the steering angle $\phi(t)$ whose phase is advanced by $\Delta t$ from that of the yaw rate $\gamma(t)$ as an input.

The above-mentioned embodiment illustrates only an example of the apparatus for estimating yaw rate in accordance with the present invention. The apparatus for estimating yaw rate in accordance with the present invention is not limited to the one in accordance with the embodiment, but may be those modifying the apparatus for estimating yaw rate in accordance with the embodiment or applying it to others within the scope not altering the gist set forth in each claim.

For example, the steering angle in the apparatus for estimating yaw rate in accordance with the present invention is not limited to the sine wave mentioned in the embodiment. The effects of the present invention can also be attained in the case of a cosine curve or a combination of sine and cosine waves.

What is claimed is:

1. An apparatus for estimating yaw rate, the apparatus comprising:
   a yaw rate acquiring part for acquiring a current yaw rate of a vehicle;
   a steering angle acquiring part for acquiring a steering angle of the vehicle;
   a steering angular velocity calculation unit for calculating a steering angular velocity according to the steering angle; and
   an estimation unit for estimating a yaw rate after a lapse of a predetermined time according to the current yaw rate and steering angular velocity.

2. An apparatus for estimating yaw rate according to claim 1, wherein the estimation unit estimates the yaw rate after the lapse of the predetermined time to be a value obtained by adding the steering angular velocity multiplied by the predetermined time to the current yaw rate.

3. An apparatus for estimating yaw rate according to claim 1, wherein the steering angle acquiring part is a yaw rate sensor.

4. An apparatus for estimating yaw rate according to claim 1, wherein the steering angle acquiring part is a steering angle sensor.

5. An apparatus for estimating yaw rate according to claim 1, wherein the steering angular velocity calculation unit and the estimation unit are constituted by an electronic control unit.

* * * * *